(12) United States Patent
Park et al.

(10) Patent No.: US 9,503,420 B2
(45) Date of Patent: Nov. 22, 2016

(54) LOGICAL NETWORK SEPARATION METHOD AND APPARATUS

(71) Applicant: ELECTRONICS AND TELECOMMUNICATIONS RESEARCH INSTITUTE, Daejeon (KR)

(72) Inventors: Pyung Koo Park, Daejeon (KR); Ho Yong Ryu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 317 days.

(21) Appl. No.: 14/049,729

(22) Filed: Oct. 9, 2013

(65) Prior Publication Data

US 2014/0304504 A1    Oct. 9, 2014

(30) Foreign Application Priority Data

Apr. 9, 2013  (KR) .................. 10-2013-0038536

(51) Int. Cl.
*H04L 29/06*         (2006.01)
(52) U.S. Cl.
CPC .................... *H04L 63/02* (2013.01)
(58) Field of Classification Search
CPC ...................................... H04L 63/02
USPC .......... 726/3, 4, 5, 6, 7; 713/162, 165, 170; 709/204, 226
See application file for complete search history.

(56) References Cited

U.S. PATENT DOCUMENTS

| | | | |
|---|---|---|---|
| 6,182,226 B1 | 1/2001 | Reid et al. | |
| 2011/0072126 A1* | 3/2011 | Wujuan | G06F 17/302 709/224 |
| 2014/0064281 A1* | 3/2014 | Basso | H04L 45/7453 370/392 |
| 2014/0146824 A1* | 5/2014 | Angst | H04L 12/4675 370/401 |

FOREIGN PATENT DOCUMENTS

| | | |
|---|---|---|
| KR | 1020090026846 A | 3/2009 |
| KR | 1020110100952 A | 9/2011 |

* cited by examiner

*Primary Examiner* — Jeffrey Pwu
*Assistant Examiner* — Nega Woldemariam
(74) *Attorney, Agent, or Firm* — Ladas & Parry LLP

(57) ABSTRACT

Disclosed are a logical network separation method and apparatus. The logical network separation method includes generating a first hash key on the basis of address information included in a service request packet, generating hash information on the basis of a transmission property of the service request packet corresponding to the first hash key when the same hash key as the first hash key is not in the hash table, and generating the policy about the reception of the service response packet corresponding to the service request packet on the basis of a destination of the service request packet. Accordingly, it is possible to block a cyber attack such as hacking, a malicious program, etc.

15 Claims, 5 Drawing Sheets

| HASH KEY | SOURCE IP | DESTINATION IP | SOURCE PORT | DESTINATION PORT | PROTOCOL | NUMBER OF SERVICE REQUESTS | SESSION REFERENCE TIME | INTERFACE |
|---|---|---|---|---|---|---|---|---|
| X | a | b | c | d | e | f | g | h |

FIG. 7

| HASH KEY | SOURCE IP | DESTINATION IP | SOURCE PORT | DESTINATION PORT | PROTOCOL | NUMBER OF SERVICE RESPONSES | SESSION REFERENCE TIME | INTERFACE |
|---|---|---|---|---|---|---|---|---|
| Y | b | a | d | c | e | i | j | k |

LOGICAL NETWORK SEPARATION METHOD AND APPARATUS

CLAIM FOR PRIORITY

This application claims priority to Korean Patent Application No. 10-2013-0038536 filed on Apr. 9, 2013 in the Korean Intellectual Property Office (KIPO), the entire contents of which are hereby incorporated by reference.

BACKGROUND

1. Technical Field

Example embodiments of the present invention relate in general to a network separation method and apparatus and more specifically to a logical network separation method and apparatus for logically separating an internal network from an external network.

2. Related Art

A network separation method is classified into a physical network separation method and a logical network separation method. The physical network separation method is a method of physically dividing all resources forming a network to separately establish an internal network and an external network. With the physical network separation method, the internal network and the external network are completely separated, thereby blocking a cyber attack such as hacking, a malicious program, etc. However, in order to separately establish the internal network and the external network, a computer for internal network connection and a computer for external network connection should be separately provided, and thus there are limitations in terms of high network establishment and operation cost. Also, the method requires works to be processed in both the computer for internal network connection and the computer for external network connection and thus has a limitation in that the work processing efficiency is reduced. Furthermore, the method requires that a file be moved through a storage medium and thus has limitations in terms of weak security.

The logical network separation method is technology for separating the internal network and the external network using virtualization technology. The logical network separation method does not require that the internal network and the external network be separately established and thus consumes a relatively low cost. Furthermore, the logical network separation method allows one computer to connect to both the internal network and the external network, thereby enhancing the work processing efficiency. However, the logical network separation method has only a few actual implementations in this field and thus has a limitation in terms of low reliability.

SUMMARY

Accordingly, example embodiments of the present invention are provided to substantially obviate one or more problems due to limitations and disadvantages of the related art.

Example embodiments of the present invention provide a logical network separation method for a service request packet for controlling a packet flow according to the sameness of a hash key generated on the basis of a hash algorithm.

Example embodiments of the present invention also provide a logical network separation method for a service response packet for controlling a packet flow according to the sameness of a hash key generated on the basis of a hash algorithm.

Example embodiments of the present invention also provide a logical network separation apparatus for controlling a packet flow according to the sameness of a hash key generated on the basis of a hash algorithm.

In some example embodiments, a logical network separation method for a service request packet, which is performed by a network separation device, includes: generating a first hash key on the basis of address information included in the service request packet, determining whether the same hash key as the first hash key is in the hash table, generating hash information on the basis of a transmission property of the service request packet corresponding to the first hash key when the same hash key as the first hash key is not in the hash table, and generating a policy about the reception of the service response packet corresponding to the service request packet on the basis of a destination of the service request packet.

The generating of the first hash key may include generating the first hash key on the basis of address information included in the service request packet when the service request packet is a packet transmitted to an external network.

The generating of the first hash key may include generating the first hash key with a predefined hash algorithm, and the predefined hash algorithm may generate a hash key of the service response packet corresponding to the service request packet having the same value as the first hash key.

The address information may include source IP address information, destination IP address information, source port address information, and destination port address information regarding the service request packet.

The logical network separation method may further include generating a second hash key by adding a predefined value to the first hash key when the same hash key as the first hash key is in the hash table.

The logical network separation method may further include storing the first hash key, the hash information corresponding to the first hash key, and the policy corresponding to the hash key in the hash table.

The hash information may include service request number information, session reference time information, and interface information.

The policy about the reception of the service response packet may include a policy to permit the reception of the service response packet corresponding to the service request packet or a policy to block the reception of the service response packet corresponding to the service request packet.

In other example embodiments, a logical network separation method for a service response packet includes generating a first hash key on the basis of address information included in the service response packet, determining whether the same hash key as the first hash key is in a hash table, updating hash information corresponding to the same hash key as the first hash key when the same hash key as the first hash key is in the hash table, and determining whether to receive the service response packet on the basis of a policy about the same hash key as the first hash key.

The generating of the first hash key may include generating the first hash key on the basis of the address infatuation included in the service request packet when the service response packet is a packet transmitted from an external network.

The generating of the first hash key may include generating the first hash key with a predefined hash algorithm, and the predefined hash algorithm may generate a hash key of the service request packet corresponding to the service response packet having the same value as the first hash key.

The logical network separation method may further include blocking the reception of the service response packet corresponding to the first hash key when the same hash key as the first hash key is not in the hash table.

The determining of whether to receive the service response packet may include receiving the service response packet when the policy is a policy to permit the reception of the service response packet and blocking the reception of the service response packet when the policy is a policy to block the reception of the service response packet.

The address information may include source IP address information, destination IP address information, source port address information, and destination port address information regarding the service response packet.

The hash information may include service request number information, session reference time information, and interface information.

In still other example embodiments, a logical network separation apparatus includes a processing unit configured to generate a first hash key on the basis of address information included in a service request packet, determine whether the same hash key as the first hash key is in the hash table, generate hash information on the basis of a transmission property of the service request packet corresponding to the first hash key when the same hash key as the first hash key is not in the hash table, and generate a policy about reception of a service response packet corresponding to the service request packet on the basis of a destination of the service request packet; and a storage unit configured to store information being processed and having been processed by the processing unit.

The processing unit may generate the first hash key with a predefined hash algorithm, and the predefined hash algorithm may generate a hash key of the service response packet corresponding to the service request packet having the same value as the first hash key.

The address information may include source IP address information, destination IP address information, source port address information, and destination port address information regarding the service request packet.

The processing unit generates a second hash key on the basis of the address information included in the service response packet, determines whether the same hash key as the second hash key is in the hash table, updates the hash information corresponding to the same hash key as the second hash key when the same hash key as the second hash key is in the hash table, and determines whether to receive the service response packet on the basis of the policy corresponding to the same hash key as the second hash key.

The processing unit may receive the service response packet when the policy is a policy to permit the reception of the service response packet and block the reception of the service response packet when the policy is a policy to block the reception of the service response packet.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

While the invention is susceptible to various modifications and alternative forms, specific embodiments thereof are shown by way of example in the drawings and will herein be described in detail.

It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," "an" and "the" are intended to include the plural foil is as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention will be described below in more detail with reference to the accompanying drawings. In describing the invention, to facilitate the entire understanding of the invention, like numbers refer to like elements throughout the description of the figures, and a repetitive description on the same element is not provided.

Figure 1:
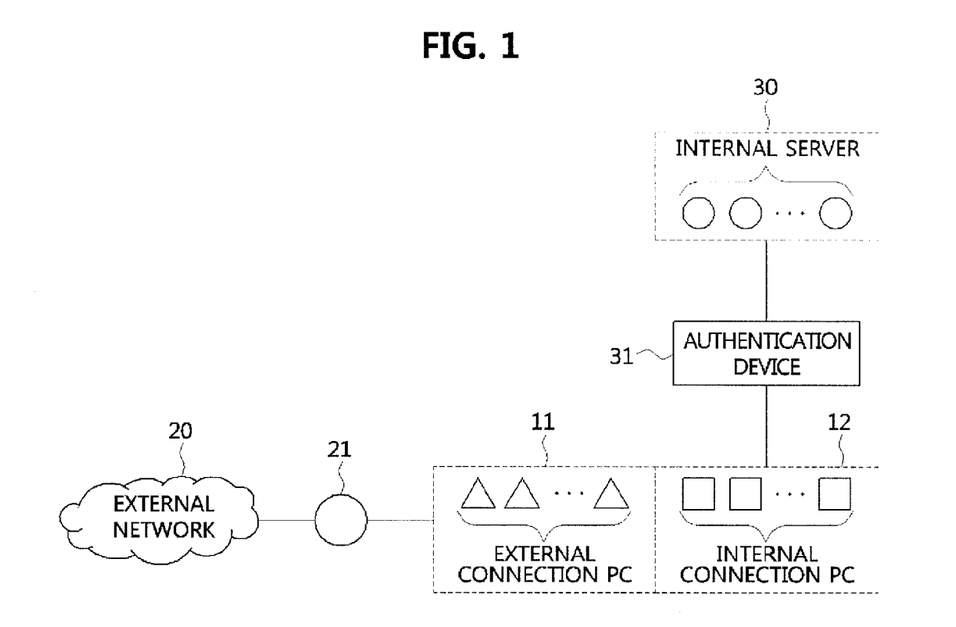
FIG. 1 is a conceptual view showing an example of a physical network separation structure.

FIG. 1 is a conceptual view showing a physical network separation structure according to an embodiment of the present invention.

Referring to FIG. 1, the physical network separation structure includes an external connection personal computer (PC) 11 for connection to the external network 20 and an internal connection PC 12 for connection to the internal server 30 (that is, an internal network), separately. When a user desires to connect to the external network 20, the user uses the external connection PC 11 to connect to the external network 20 through a gateway 21. When a user desires to connect to the internal server 30, the user uses the internal connection PC 12 to connect to the internal server 30 through a security device 31.

As such, the physical network separation may ensure visibility to allow the separation to be checked with one's eyes directly and ensure systematic security through its dual network configuration to support perfect network separation. Accordingly, since the external network 20 is separated from the internal server 30, it is possible to basically block a cyber attack, such as leakage of important data, at a user PC level, and it is also possible to block the leakage of data through unknown types of hacking technology. However, the physical network separation has a dual network configuration and thus has a limitation in that network establishment and operation cost is higher than that of the logical network separation. Also, the physical network separation has limitations in that, because work processing is inconvenient, productivity and efficiency are low and security for file movement with a storage medium is difficult to ensure.

Figure 2:
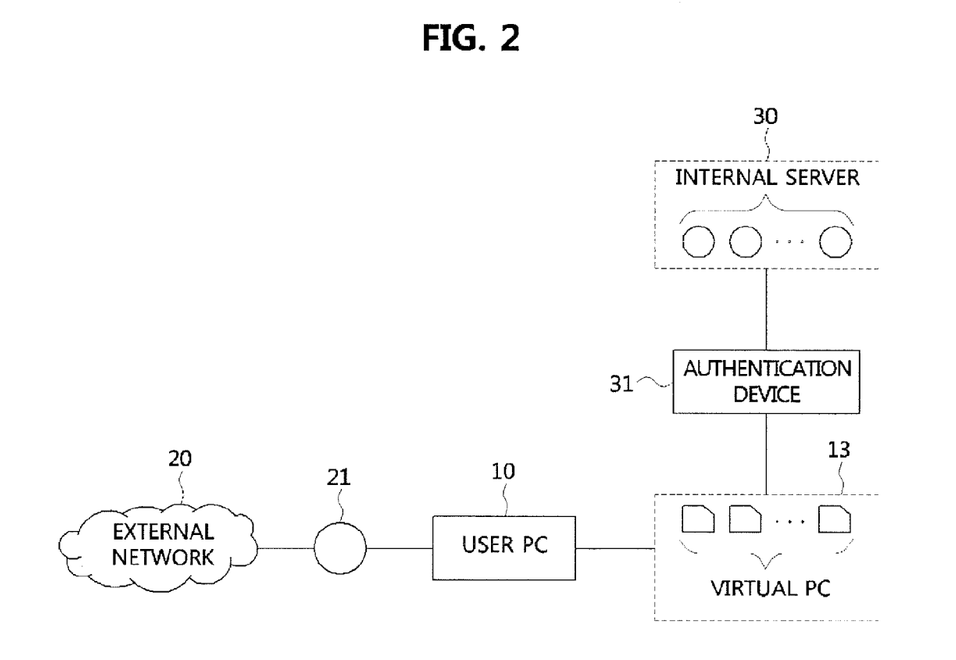
FIG. 2 is a conceptual view showing an example of a logical network separation structure.

FIG. 2 is a conceptual view showing an example of a logical network separation structure.

Referring to FIG. 2, a user connects to the external network 20 and the internal server 30 using a user PC 10. When the user desires to connect to the external network 20, the user uses the user PC 10 to connect to the external network 20 through a gateway 21. When the user desires to connect to the internal server 30, the user uses the user PC 10 to connect to a virtual PC 13 via authentication for connection to the internal server 30 and uses the virtual PC 13 to connect to the internal server 30 through the security device 31.

The virtualization used in the logical network separation is a method for connecting to the internal server 30 or a security area through user authentication. A series of works, such as generation, check, and download of a document, should be performed only in the internal server 30 or the security area. Accordingly, with the logical network separation, it is possible to block leakage of information, manage the history of user events, and manage data and users according to a security policy of a company. However, because the logical network separation using virtualization has only a few actual implementations in this field, reliability is low, and there are security risks in terms of direct connection from the internal server 30 to the external network 20.

Figure 3:
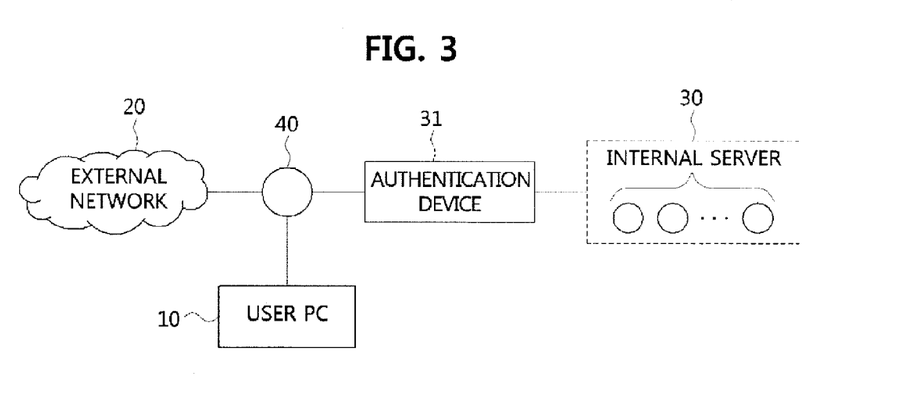
FIG. 3 is a conceptual view showing a logical network separation structure according to an embodiment of the present invention.

FIG. 3 is a conceptual view showing a logical network separation structure according to an embodiment of the present invention.

Referring to FIG. 3, the logical network separation structure according to an embodiment of the present invention includes a user PC 10, an external network 20, an internal server 30 (that is, an internal network), an authentication device 31, and a logical network separation apparatus 40. When the user desires to connect to the external network 20, the user may use the user PC 10 to connect to the external network 20 through the logical network separation apparatus 40. When the user desires to connect to the internal server 30, the user may use the user PC 10 to connect to the internal server 30 through the logical network separation apparatus 40.

The logical network separation apparatus 40 may logically separate the external network and the internal server 30. The logical network separation apparatus 40 may include a user interface, an external network interface, and the internal server interface, communicate a packet with the user PC 10 through a session according to the user interface, communicate a packet with the external network 20 through a session according to the external network interface, and communicate a packet with the internal server 30 through a session according to the internal server interface.

The configuration and functions of the logical network separation apparatus 40 will be described in detail later. The logical network separation method applied to the logical network separation structure shown in FIG. 3 will be described in detail below.

Figure 4:
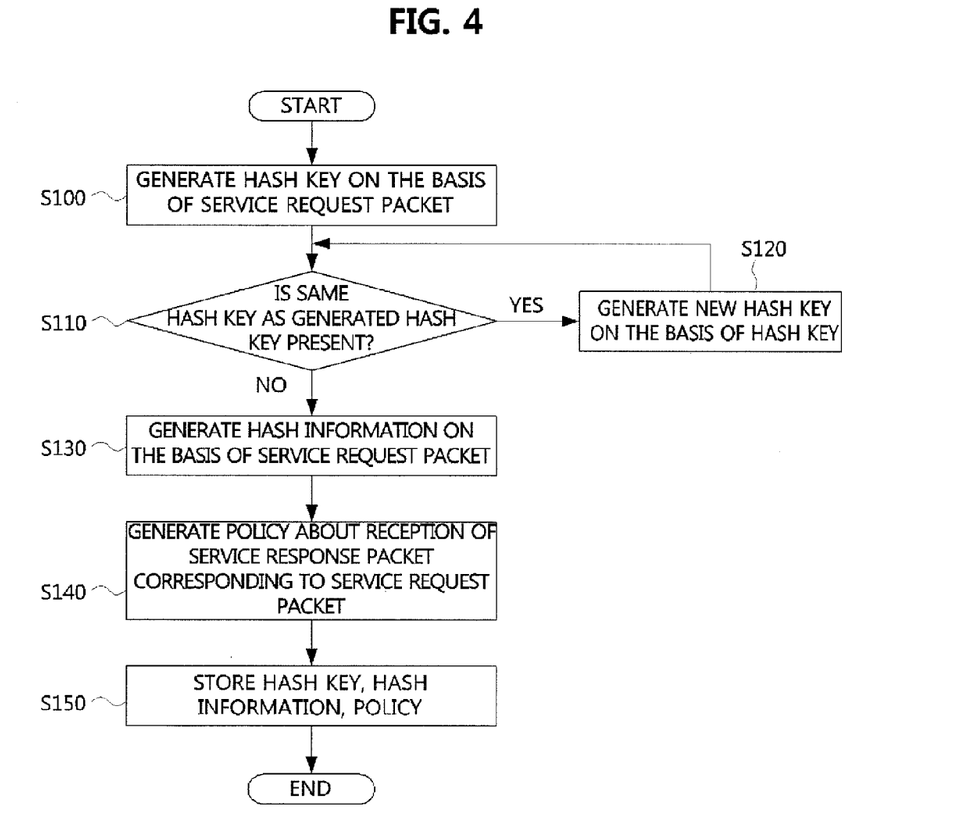
FIG. 4 is a flowchart showing a logical network separation method for a service request packet according to an embodiment of the present invention.

FIG. 4 is a flowchart showing a logical network separation method for a service request packet according to an embodiment of the present invention.

Referring to FIG. 4, the logical network separation method for a service request packet includes generating a first hash key on the basis of address information included in the service request packet (S100), determining whether the same hash key as the first hash key is in a hash table (S110), generating hash information on the basis of a transmission property of the service request packet corresponding to the first hash key if the same hash key as the first hash key is not in the hash table (S130), generating a policy about whether to receive a service response packet corresponding to the service request packet on the basis of a destination of the service request packet (S140), and storing the first hash key, the hash information corresponding to the first hash key, and the policy corresponding to the first hash key in the hash table (S150).

Furthermore, the logical network separation method for the service request packet further includes generating a second hash key by adding a predefined value to the first hash key if the same hash key as the first hash key is in the hash table (S120).

Each operation of the logical network separation method for the service request packet may be performed by the logical network separation apparatus 40 (see FIG. 3). Here, the logical network separation apparatus may denote a gateway.

In operation S100, the logical network separation apparatus may generate the first hash key on the basis of the address information included in the service request packet. The service request packet may include source Internet protocol (IP) address information, destination IP address information, source port address information, destination port address information, protocol information, etc.

The service request packet may denote a packet transmitted from the user PC 10 (see FIG. 3), and the logical network separation apparatus may generate the first hash key for the service request packet when the destination of the service request packet is the external network 20 (see FIG. 3).

Specifically, the logical network separation apparatus may determine the destination of the service request packet on the basis of the destination IP address information included in the service request packet and generate the first hash key on the basis of the source IP address information, destination IP address information, source port address information, and destination port address information included in the service request packet when the destination is the external network.

The logical network separation apparatus may generate the first hash key of the service request packet, using Equation (1).

$$\text{Hash key}=(a \text{ xor } b)+((c<<16|d)\text{xor}(c|d<<16)) \quad (1)$$

where 'a' is the source IP address information of the service request packet, 'b' is the destination IP address information of the service request packet, 'c' is the source port address information of the service request packet, and 'd' is the destination port address information of the service request packet.

According to Equation (1), the same hash key of the service response packet corresponding to the service request packet as the first hash key of the service request packet may be generated (that is, the first hash key of the service request packet=the hash key of the service response packet). The service response packet may denote a service response transmitted according to the service request. For example, the service response packet corresponding to the service request packet transmitted from the user PC to the external network may denote a packet transmitted from the external network to the user PC according to the service request.

That is, the source IP address information of the service request packet is the same as the destination IP address information of the service response packet corresponding to the service request packet. The destination IP address information of the service request packet is the same as the source IP address information of the service response packet corresponding to the service request packet. The source port address information of the service request packet is the same as the destination port address information of the service response packet corresponding to the service request packet. The destination port address information of the service request packet is the same as the source port address information of the service response packet corresponding to the service request packet. Accordingly, with Equation (1), the hash key of the service response packet corresponding to the service request packet has the same value as the hash key of the service request packet.

In operation S110, the logical network separation apparatus may determine whether the same hash key as the first hash key is in the hash table. The hash table may include a hash key and hash information about the service request packet corresponding to the hash key. The hash information may be generated on the basis of the service request packet. The hash information and the hash table will be described in detail later.

When the same hash key as the first hash key is in the hash table, the logical network separation apparatus performs the next operation S120. When the same hash key as the first hash key is not in the hash table, the logical network separation apparatus performs the next operations S130, S140, and S150, sequentially.

In operation S120, the logical network separation apparatus may generate a second hash key by adding a predefined value to the first hash key if the same hash key as the first hash key is in the hash table.

That is, the logical network separation apparatus may generate the second hash key for the first hash key, using Equation (2).

$$V_n=h_n(V_{n-1})=h_{n-1}(Key)+1, n>0 \quad (2)$$

where, when 'n=1,' $h_0$(Key) is the first hash key calculated using Equation (1) and $V_1$ (that is, $h_1(V_0)$) is the second hash key for the first hash key, and when 'n=2,' $h_1$(Key) is the second hash key and $V_2$ (that is, $h_2(V_1)$) is the third hash key for the second hash key.

A process of applying the hash algorithm such as Equation (1) and Equation (2) will be described below with reference to FIG. 5.

Figure 5:
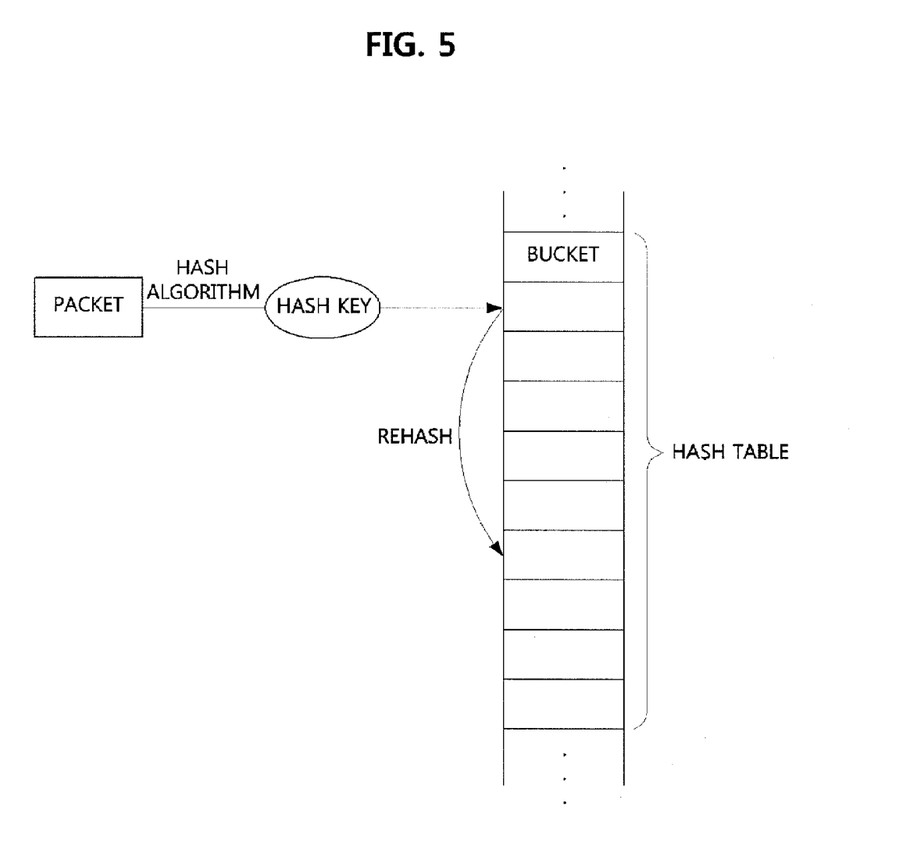
FIG. 5 is a concept view showing an example of a process of applying a hash algorithm application process according to an embodiment of the present invention.

FIG. 5 is a concept view showing an example of a process of applying a hash algorithm application process according to an embodiment of the present invention.

Referring to FIG. 5, the logical network separation apparatus applies the hash algorithm, such as Equation (1), to the packet to generate the first hash key and determines whether the same hash key as the first hash key is in the a bucket of the hash table. When the same hash key as the first hash key is not in the hash table, the logical network separation apparatus stores the first hash key in the bucket of the hash table.

When the same hash key as the first hash key is in the hash table, the logical network separation apparatus applies Equation (2) to the first hash key to generate the second hash key, and determines whether the same hash key as the second hash key is in the bucket of the hash table. The logical network separation apparatus stores the second hash key in the bucket of the hash table when the same hash key as the second hash key is not in the hash table, and applies Equation (2) to the second hash key to generate a third hash key when the same hash key as the second hash key is in the bucket of the hash table. That is, the logical network separation apparatus may apply Equation (2) to generate a new hash key which is not in the bucket of the hash table.

Returning to FIG. 4, in operation S130, the logical network separation apparatus may generate hash information on the basis of a transmission property of the service request packet corresponding to the first hash key when the same hash key as the first hash key is not in the hash table.

The hash information may include the source IP address information, destination IP address information, source port information, destination port information, protocol information, service request number information, session reference time information, and interface information regarding the service request packet.

Here, the service request number information (request per second (RPS)) denotes the number of service requests. The session reference time information denotes the time at which generated session information (that is, hash information) was last referenced, and the generated session reference time information may be deleted if the session reference time information is not referenced during a predefined time The interface information denotes an interface for a service request. The interface information denotes a user interface if the service request is from the user PC, an external network interface if the service request is from the external network, and an internal server interface if the service request is from the internal server.

In operation S140, the logical network separation apparatus may generate a policy about whether the service response packet corresponding to the service request packet is received on the basis of the destination of the service request packet. The policy about whether to receive the service response packet may be a policy to permit the reception of the service response packet corresponding to the service request packet or a policy to block the reception of the service response packet corresponding to the service request packet.

For example, the logical network separation apparatus may set the policy to block the reception of the service response packet corresponding to the service request packet when the destination of the service request packet is the external network having a low security level (that is, the network has a high possibility of undergoing a cyber attack such as hacking, a malicious program, etc.).

The logical network separation apparatus may set the policy to permit the reception of the service response packet corresponding to the service request packet when the destination of the service request packet is the external network having a high security level (that is, the network has a low possibility of undergoing a cyber attack such as hacking, a malicious program, etc.).

When the policy about the service request packet is not set, the logical network separation apparatus may block the reception of the service response packet corresponding to the service request packet.

In operation S150, the logical network separation apparatus may store the first hash key, the hash information corresponding to the first hash key, and the policy corresponding to the first hash key in the hash table. The hash table may include at least one data structure, and the data structure for the service request packet may include the hash key, the hash information corresponding to the hash key, and the policy corresponding to the hash key.

Figure 6:
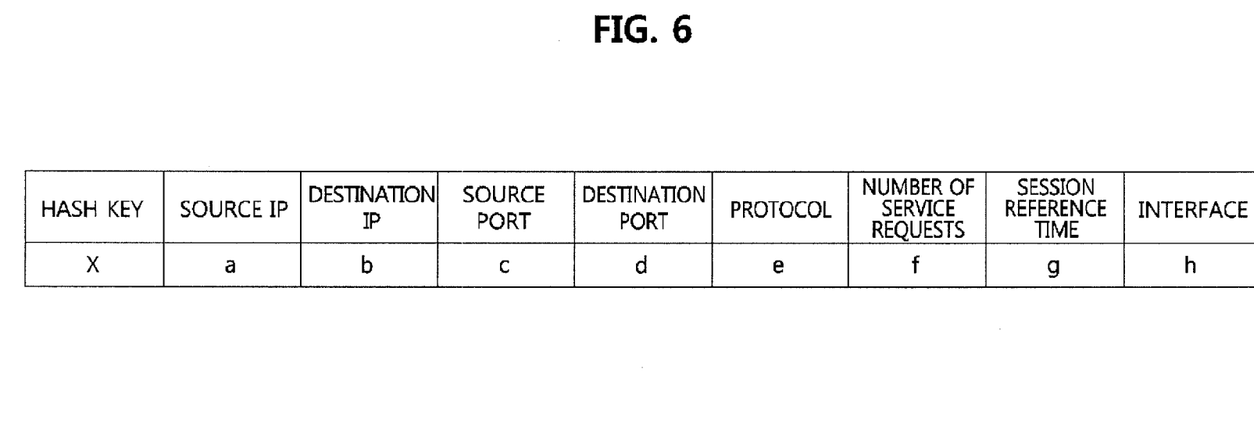
FIG. 6 is a block diagram showing an example of a data structure for a service request packet.

The data structure for the service request packet is as shown in FIG. 6. FIG. 6 is a block diagram showing an example of a data structure for a service request packet.

Referring to FIG. 6, the data structure for the service request packet may include hash key information (X), source IP address information (a), destination IP address information (b), source port address information (c), destination port address information (d), protocol information (e), service request number information (f), session reference time information (g), and interface information (h). Furthermore, the data structure for the service request packet may further include policy information (not shown).

The hash key information (X) may be generated on the basis of the source IP address information (a), destination IP address information (b), source port address information (c), and destination port address information (d) included in the service request packet. That is, the hash key information (X) may denote a hash key calculated using Equation (1) or Equation (2).

The service request number information (request per second (RPS)) (f) denotes the number of service requests. The session reference time information (g) denotes the last time to reference generated session information (that is, information included in the data structure for the service request packet), and the generated session reference time information (g) may be deleted if the session reference time information is not referenced during a predefined time The interface information (h) denotes an interface for a service request. The interface information (h) denotes a user interface if the service request is from the user PC, an external network interface if the service request is from the external network, and an internal server interface if the service request is from the internal server.

Figure 7:
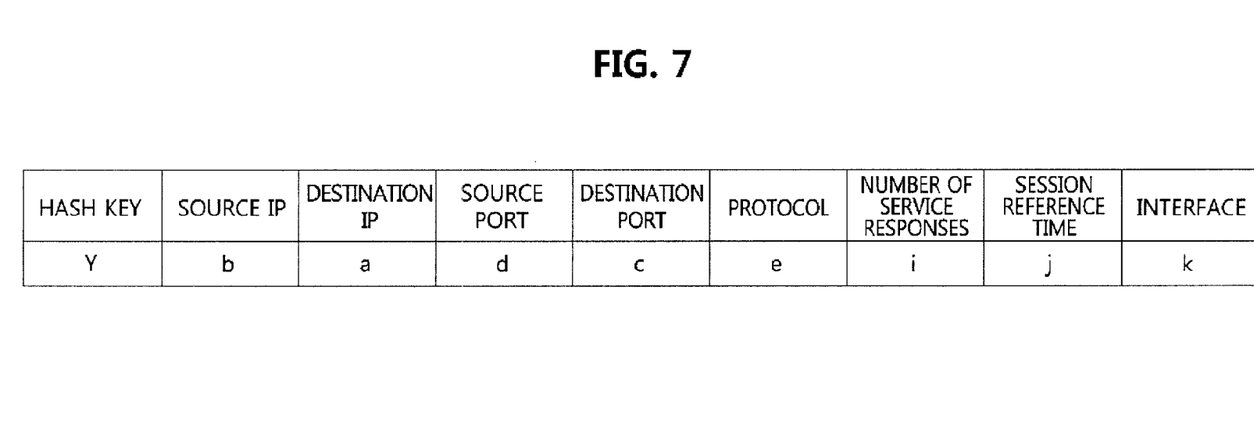
FIG. 7 is a block diagram showing an example of a data structure for a service response packet.

The data structure for the service response packet corresponding to the service request packet is as shown in FIG. 7. The service response packet corresponding to the service request packet denotes a service response provided upon the service request.

FIG. 7 is a block diagram showing an example of a data structure for a service response packet.

Referring to FIG. 7, the data structure for the service response packet may include hash key information (y), source IP address information (b), destination IP address information (a), source port address information (d), destination port address information (c), protocol information (e), service response number information (i), session reference time information (j), and interface information (k).

The hash key information (Y) may be generated on the basis of the source IP address information (b), destination IP address information (a), source port address information (d), and destination port address information (c) included in the service request packet. That is, the hash key information (Y) may denote a hash key calculated using Equation (1).

The service response number information (request per second (RPS)) (i) denotes the number of service responses. The session reference time information (j) denotes the time at which generated session information (that is, information included in the data structure for the service response packet) was last referenced, and the generated session reference time information (j) may be deleted if the session reference time information (j) is not referenced during a predefined time The interface information (k) denotes an interface for a service response. The interface information (k) denotes a user interface if the service response is from the user PC, an external network interface if the service request is from the external network, and an internal server interface if the service request is from the internal server.

Figure 8:
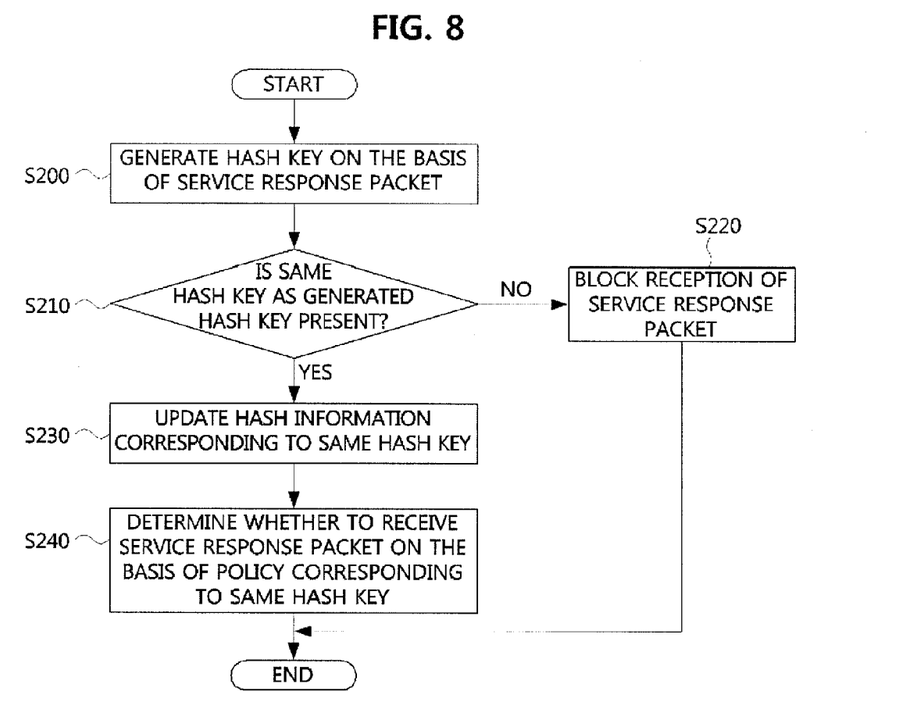
FIG. 8 is a flowchart showing a logical network separation method for a service response packet according to an embodiment of the present invention.

FIG. 8 is a flowchart showing a logical network separation method for a service response packet according to an embodiment of the present invention.

Referring to FIG. 8, the logical network separation method for a service response packet includes generating a first hash key on the basis of address information included in the service response packet (S200), determining whether the same hash key as the first hash key is in a hash table (S210), updating hash information corresponding to the same hash key as the first hash key if the same hash key as the first hash key is in the hash table (S230), and determining whether to receive a service response packet on the basis of a policy about the same hash key as the first hash key (S240).

Furthermore, the logical network separation method for the service response packet further includes blocking the reception of the service response packet corresponding to the first hash key when the same hash key as the first hash key is not in the hash table (S220).

Each operation of the logical network separation method for the service response packet may be performed by the logical network separation apparatus 40 (see FIG. 3). Here, the logical network separation apparatus may denote a gateway.

In operation S200, the logical network separation apparatus may generate the first hash key on the basis of the address information included in the service response packet. The service response packet may include source IP address information, destination IP address information, source port address information, destination port address information, protocol information, etc.

The service response packet may denote a packet transmitted from the external network 20 (see FIG. 3), and the logical network separation apparatus may generate the first hash key for the service response packet when the source of the service response packet is the external network 20 (see FIG. 3). Specifically, the logical network separation apparatus may determine the source of the service response packet on the basis of the source IP address information included in the service response packet and generate the first hash key on the basis of the source IP address information, destination IP address information, source port address information, and destination port address information included in the service response packet when the source is the external network.

The logical network separation apparatus may generate the first hash key of the service response packet, using Equation (1). In Equation (1), 'a' is the source IP address information of the service response packet, 'b' is the destination IP address information of the service response packet, 'c' is the source port address information of the service response packet, and 'd' is the destination port address information of the service response packet.

In operation S210, the logical network separation apparatus may determine whether the same hash key as the first hash key is in the hash table. The hash table may include at least one data structure, and the data structure may include the hash key, the hash information about the service request packet corresponding to the hash key, and the policy information corresponding to the hash key.

The hash information about the service request packet may include source IP address information, destination IP address information, source port address information, destination port address information, protocol information, service request number information, session reference time information, and interface information (see FIG. 6). The policy information denotes a policy about whether to receive the service response packet corresponding to the hash key.

When the same hash key as the first hash key is not in the hash table, the logical network separation apparatus may perform the next operation S220. When the same hash key as the first hash key is in the hash table, the logical network separation apparatus may perform the next operations S230 and S240 sequentially.

In operation S220, the logical network separation apparatus may block the reception of the service response packet corresponding to the first hash key when the same hash key as the first hash key is not in the hash table.

That is, a case in which the same hash key as the first hash key is not in the hash table denotes transmitting unrequested service response information, and the unrequested service response information may be a cyber attack such as hacking, a malicious program, etc. In this case, the logical network separation apparatus may block the reception of the service response packet corresponding to the first hash key.

Also, a case in which the same hash key as the first hash key is not in the hash table may indicate that no policy about whether to receive the service response packet is set. In this case, the logical network separation apparatus may block the reception of the service response packet corresponding to the first hash key.

In operation S230, the logical network separation apparatus may update the hash information corresponding to the same hash key as the first hash key when the same hash key as the first hash key is in the hash table. The hash information corresponding to the same hash key as the first hash key is hash information about the service request information, and thus the logical network separation apparatus may update the hash information corresponding to the same hash key as the first hash key to the hash information about the service response packet.

Here, the hash information corresponding to the same hash key as the first hash key denotes the hash information shown in FIG. 6, and the hash information about the service response packet denotes the hash information shown in FIG. 7.

That is, the logical network separation apparatus may update the source IP address information of the service request packet with the source IP address information of the service response packet, update the destination IP address information of the service request packet with the destination IP address information of the service response packet, update the source port information of the service request packet with the source port information of the service response packet, update the destination port information of the service request packet with the destination port information of the service response packet, update the protocol information of the service request packet with the protocol information of the service response packet, update the service request number information of the service request packet with the service request number information of the service response packet, update the session reference time information of the service request packet with the session reference time information of the service response packet, and update the interface information of the service request packet with the interface information of the service response packet.

In operation S240, the logical network separation apparatus may determine whether to receive the service response packet on the basis of the policy corresponding to the same hash key as the first hash key. When the policy corresponding to the same hash key as the first hash key is the policy to permit the reception of the service response packet corresponding to the first hash key, the logical network separation apparatus may receive the service response packet. That is, the logical network separation apparatus transmits the service response packet to the destination of the service response packet.

When the policy corresponding to the same hash key as the first hash key is the policy to block the reception of the service response packet corresponding to the first hash key, the logical network separation apparatus may block the reception of the service response packet. That is, the logical network separation apparatus does not transmit the service response packet to the destination of the service response packet.

The sound virtualization method according to an embodiment of the present invention may be implemented as program instructions executable by a variety of computers, and then recorded on a computer readable medium. The computer readable medium may include a program instruction, a data file, a data structure, or a combination thereof. The program instructions recorded on the computer readable medium may be designed and configured specifically for the present invention or can be publically known and available to those who are skilled in the field of software. Examples of the computer readable medium may include a hardware device such as a ROM, a RAM, or a flash memory, which is specifically configured to store and execute the program instructions. Examples of the program instructions can include machine codes made by, for example, a compiler, as well as high-level language codes executable by a computer with an interpreter. The above exemplary hardware devices can be configured to operate as one or more software modules in order to perform the operation in an exemplary embodiment, and the opposite is also possible.

Figure 9:
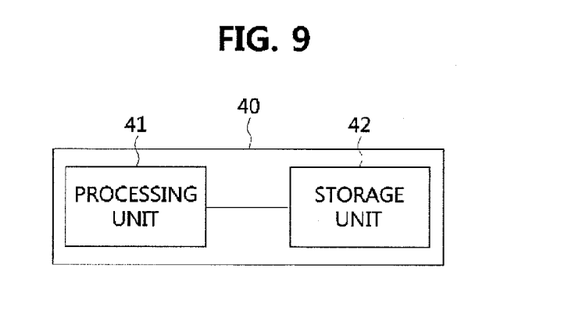
FIG. 9 is a block diagram showing a logical network separation apparatus according to an embodiment of the present invention.

FIG. 9 is a block diagram showing a logical network separation apparatus according to an embodiment of the present invention.

Referring to FIG. 9, the logical network separation apparatus 40 may include a processing unit 41 and the storage unit 42. The processing unit 41 may generate the first hash key on the basis of the address information included in the service request packet, determine whether the same hash key as the first hash key is in the hash table, generate the hash information on the basis of the transmission property of the service request packet corresponding to the first hash key when the same hash key as the first hash key is not in the hash table, and generate the policy about the reception of the service response packet corresponding to the service request packet on the basis of the destination of the service request packet.

Furthermore, the processing unit 41 may generate the new hash key by adding a predefined value to the first hash key when the same hash key as the first hash key is in the hash table.

The storage unit 42 may store information being processed and having been processed by the processing unit 41. That is, the storage unit 42 may store the service request packet, service response packet, hash algorithm, hash key, hash information, policy, hash table, etc.

Here, the logical network separation apparatus 40 may denote the logical network separation apparatus 40 as shown in FIG. 3. That is, the logical network separation apparatus 40 may denote a gateway. Also, the logical network separation apparatus 40 may include only the processing unit 41, and in this case, the storage unit 42 may be separated from the logical network separation apparatus 40.

The processing unit 41 may generate the first hash key on the basis of the address information included in the service request packet. That is, the processing unit 41 may generate the first hash key on the basis of operation S100 (see FIG. 4).

The service request packet may include the source IP address information, destination IP address information, source port address information, destination port address information, protocol information, etc.

The service request packet may denote a packet transmitted from the user PC 10 (see FIG. 3), and the processing unit 41 may generate the first hash key for the service request packet when the destination of the service request packet is the external network 20 (see FIG. 3). Specifically, the processing unit 41 may determine the destination of the service request packet on the basis of the destination IP address information included in the service request packet and generate the first hash key on the basis of the source IP address information, destination IP address information, source port address information, and destination port address information included in the service request packet when the destination is the external network.

The processing unit 41 may generate the first hash key of the service request packet, using Equation (1). In Equation (1), 'a' is the source IP address information of the service request packet, 'b' is the destination IP address information of the service request packet, 'c' is the source port address information of the service request packet, and 'd' is the destination port address information of the service request packet.

According to Equation (1), the same hash key of the service response packet corresponding to the service request packet as the first hash key of the service request packet may be generated (that is, the first hash key of the service request packet=the hash key of the service response packet). The service response packet may denote a service response transmitted according to the service request. For example, the service response packet corresponding to the service request packet transmitted from the user PC to the external network may denote a packet transmitted from the external network to the user PC according to the service request.

The processing unit 41 may determine whether the same hash key as the first hash key is in the hash table. That is, the processing unit 41 may determine whether the same hash key as the first hash key is in the hash table on the basis of operation S110 (see FIG. 4). The hash table may include the hash key and hash information about the service request packet corresponding to the hash key. The hash information may be generated on the basis of the service request packet.

The processing unit 41 may generate the new hash key by adding a predefined value to the first hash key when the same hash key as the first hash key is in the hash table. That is, the processing unit 41 may generate the new hash key on the basis of operation S120 (see FIG. 4).

The processing unit 41 may generate the new hash key for the first hash key, using Equation (2). In Equation (2), when 'n=1,' $h_0$(Key) is the first hash key calculated using Equation (1) and $V_1$ (that is, $h_1$ ($V_0$)) is the new hash key for the first hash key.

The processing unit 41 may generate the hash information on the basis of the transmission property of the service request packet corresponding to the first hash key when the same hash key as the first hash key is not in the hash table. That is, the processing unit 41 may generate the hash information on the basis of operation S130 (see FIG. 4).

The hash information may include source IP address information, destination IP address information, source port information, destination port information, protocol information, service request number information, session reference time information, and interface information regarding the service request packet.

Here, the service request number information denotes the number of service requests. The session reference time information denotes the time at which generated session information (that is, hash information) was last referenced, and the generated session reference time information may be deleted if the session reference time information is not referenced during a predefined time The interface information denotes an interface for a service request. The interface information denotes a user interface if the service request is from the user PC, an external network interface if the service request is from the external network, and an internal server interface if the service request is from the internal server.

The processing unit 41 may generate a policy about whether to receive the service response packet corresponding to the service request packet on the basis of the destination of the service request packet. That is, the processing unit 41 may generate the policy about the reception of the service response packet on the basis of operation S140 (see FIG. 4).

The policy about whether to receive the service response packet may be a policy to permit the reception of the service response packet corresponding to the service request packet or a policy to block the reception of the service response packet corresponding to the service request packet.

For example, the processing unit 41 may set the policy to block the reception of the service response packet corresponding to the service request packet when the destination of the service request packet is the external network having a low security level (that is, the network has a high possibility of undergoing a cyber attack such as hacking, a malicious program, etc.).

The processing unit 41 may set the policy to permit the reception of the service response packet corresponding to the service request packet when the destination of the service request packet is the external network having a high security level (that is, the network has a low possibility of undergoing a cyber attack such as hacking, a malicious program, etc.).

When the policy about the service request packet is not set, the processing unit 41 may block the reception of the service response packet corresponding to the service request packet.

The processing unit 41 may generate the second hash key on the basis of the address information included in the service response packet, determine whether the same hash key as the second hash key is in the hash table, update the hash information corresponding to the same hash key as the second hash key when the same hash key as the second hash key is in the hash table, and determine whether to receive the service response packet on the basis of the policy corresponding to the same hash key as the second hash key.

Furthermore, the processing unit 41 may block the reception of the service response packet corresponding to the second hash key when the same hash key as the second hash key is not in the hash table.

The processing unit 41 may generate the second hash key on the basis of the address information included in the service response packet. That is, the processing unit 41 may generate the second hash key on the basis of operation S200 (see FIG. 8).

The service response packet may include source IP address information, destination IP address information, source port address information, destination port address information, protocol information, etc.

The service response packet may denote a packet transmitted from the external network 20 (see FIG. 3), and the processing unit 41 may generate the second hash key for the service response packet when the source of the service response packet is the external network 20 (see FIG. 3). Specifically, the processing unit 41 may determine the source of the service response packet on the basis of the source IP address information included in the service response packet and generate the second hash key on the basis of the source IP address information, destination IP address information, source port address information, and destination port address information included in the service response packet when the source is the external network.

The processing unit 41 may generate the first hash key of the service response packet, using Equation (1). In Equation (1), 'a' is the source IP address information of the service response packet, 'b' is the destination IP address information of the service response packet, 'c' is the source port address information of the service response packet, and is the destination port address information of the service response packet.

The processing unit 41 may determine whether the same hash key as the second hash key is in the hash table. That is, the processing unit 41 may determine whether the same hash key as the second hash key is in the hash table on the basis of operation S210 (see FIG. 8).

The hash table may include at least one data structure, and the data structure may include the hash key, the hash information about the service request packet corresponding to the hash key, and the policy information corresponding to the hash key.

The hash information about the service request packet may include source IP address information, destination IP address information, source port address information, destination port address information, protocol information, service request number information, session reference time information, and interface information (see FIG. 6). The policy information denotes a policy about whether to receive the service response packet corresponding to the hash key.

The processing unit 41 may block the reception of the service response packet corresponding to the second hash key when the same hash key as the second hash key is not in the hash table. That is, the processing unit 41 may block the reception of the service response packet corresponding to the second hash key on the basis of operation S220 (see FIG. 8).

That is, a case in which the same hash key as the second hash key is not in the hash table denotes transmitting unrequested service response information, and the unrequested service response information may be a cyber attack such as hacking, a malicious program, etc. In this case, the processing unit 41 may block the reception of the service response packet corresponding to the second hash key.

Also, a case in which the same hash key as the second hash key is not in the hash table may indicate that no policy about whether to receive the service response packet is set. In this case, the processing unit 41 may block the reception of the service response packet corresponding to the second hash key.

The processing unit 41 may update the hash information corresponding to the same hash key as the second hash key when the same hash key as the second hash key is in the hash table. That is, the processing unit 41 may update the hash information corresponding to the same hash key as the second hash key on the basis of operation S230 (see FIG. 8).

The hash information corresponding to the same hash key as the second hash key is hash information about the service request information, and thus the processing unit 41 may update the hash information corresponding to the same hash key as the second hash key with the hash information about the service response packet.

Here, the hash information corresponding to the same hash key as the second hash key denotes the hash information shown in FIG. 6, and the hash information about the service response packet denotes the hash information shown in FIG. 7.

The processing unit 41 may determine whether to receive the service response packet on the basis of the policy corresponding to the same hash key as the second hash key. That is, the processing unit 41 may determine whether to receive the service response packet on the basis of the operation S240 (see FIG. 8).

When the policy corresponding to the same hash key as the second hash key is the policy to permit the reception of the service response packet corresponding to the second hash key, the processing unit 41 may receive the service response packet. That is, the processing unit 41 transmits the service response packet to the destination of the service response packet.

When the policy corresponding to the same hash key as the second hash key is the policy to block the reception of the service response packet corresponding to the second hash key, the processing unit 41 may block the reception of the service response packet. That is, the processing unit 41 does not transmit the service response packet to the destination of the service response packet.

Here, the processing unit 41 may include a processor and a memory. The processor may include a general-purpose processor (for example, a central processing unit (CPU) and/or a graphics processing unit (GPU), etc.) or a special-purpose processor for performing the logical network separation method. The memory may store a program code for performing the logical network separation method. That is, the processor may read the program code stored in the memory and perform each operation of the virtual separation method on the basis of the read program code.

According to the present invention, it is possible to block a cyber attack such as hacking, a malicious program, etc. by controlling the packet flow on the basis of the sameness of the hash key and the predefined policy.

While the example embodiments of the present invention and their advantages have been described in detail, it should be understood that various changes, substitutions, and alterations may be made herein without departing from the scope of the invention.

What is claimed is:

1. A logical network separation method for a service request packet, performed by a network separation apparatus, the logical network separation method comprising:
wherein the network separation apparatus includes a user interface, an external network interface, and an internal network interface, the user interface is used for communication with a user terminal, the external network interface is used for communication with an external network, the internal network interface is used for communication with an internal network,
receiving the service request packet from the user terminal via the user interface;
determining whether a destination of the service request packet is an external network or an internal network;
generating a first hash key on the basis of address information included in the service request packet when it is determined that the destination of the service request packet is the external network;
determining whether the first hash key is in a hash table;
generating hash information on the basis of a transmission property of the service request packet corresponding to the first hash key when the first hash key is not in the hash table;
generating a policy about reception of a service response packet corresponding to the service request packet on the basis of the destination of the service request packet, wherein the policy is used for determining whether to permit reception of the service response packet; and
transmitting the service request packet to the external network via the external network interface,
wherein the policy about the reception of the service response packet comprises a policy to permit the reception of the service response packet corresponding to the service request packet or a policy to block the reception of the service response packet corresponding to the service request packet.

2. The logical network separation method of claim 1, wherein the generating of the first hash key comprises generating the first hash key with a predefined hash algorithm, and
the predefined hash algorithm generates a hash key, having the same value as the first hack key, of the service response packet corresponding to the service request packet.

3. The logical network separation method of claim 1, wherein the address information comprises source Internet protocol (IP) address information, destination IP address information, source port address information, and destination port address information regarding the service request packet.

4. The logical network separation method of claim further comprising generating a second hash key by adding a predefined value to the first hash key when the first hash key is in the hash table.

5. The logical network separation method of claim 1, further comprising storing the first hash key, the hash information corresponding to the first hash key, and the policy corresponding to the first hash key in the hash table.

6. The logical network separation method of claim 1, wherein the hash information comprises service request number information, session reference time information, and interface information.

7. A logical network separation method for a service response packet, performed by a network separation apparatus, the logical network separation method comprising:
wherein the network separation apparatus includes a user interface, an external network interface, and an internal network interface, the user interface is used for communication with a user terminal, the external network interface is used for communication with an external network, the internal network interface is used for communication with an internal network,
receiving the service response packet from the external network via the external network interface;
generating a first hash key on the basis of address information included in the service response packet;
determining whether the first hash key is in a hash table for logical network separation;
updating hash information corresponding to the first hash key when the first hash key is in the hash table;
determining whether to receive the service response packet on the basis of a policy corresponding to the first hash key, wherein the policy is generated on the basis of a destination of a service request packet to request the service response packet; and
transmitting, when reception of the service response packet is permitted, the service response packet to the user terminal which has transmitted the service request packet via the user interface,
wherein the determining of whether to receive the service response packet comprises receiving the service response packet when the policy is a policy to permit the reception of the service response packet and blocking the reception of the service response packet when the policy is a policy to block the reception of the service response packet.

8. The logical network separation method of claim 7, wherein the generating of the first hash key comprises generating the first hash key with a predefined hash algorithm, and
the predefined hash algorithm generates a hash key, having the same value as the first hack key, of the service request packet corresponding to the service response packet.

9. The logical network separation method of claim 7, further comprising blocking the reception of the service response packet corresponding to the first hash key when the first hash key is not in the hash table.

10. The logical network separation method of claim 7, wherein the address information comprises source Internet protocol (IP) address information, destination IP address information, source port address information, and destination port address information regarding the service response packet.

11. The logical network separation method of claim 7, wherein the hash information comprises service response number information, session reference time information, and interface information.

12. A logical network separation apparatus comprising:
- a user interface configured to communicate with a user terminal;
- an external network interface configured to communicate with an external network;
- an internal network interface configured to communicate with an internal network;
- a processing unit configured to receive a service request packet from the user terminal via the user interface, determine whether a destination of the service request packet is the external network or the internal network, generate a first hash key on the basis of address information included in a service request packet when it is determined that the destination of the service request packet is the external network, determine whether the first hash key is in the hash table, generate hash information on the basis of a transmission property of the service request packet corresponding to the first hash key when the first hash key is not in the hash table, generate a policy about reception of a service response packet corresponding to the service request packet on the basis of a destination of the service request packet, wherein the policy is used for determining whether to permit reception of the service response packet, and transmit the service request packet to the external network via the external network interface; and
- a storage unit configured to store information being processed and having been processed by the processing unit,
- wherein the processing unit receives the service response packet when the policy is a policy to permit the reception of the service response packet and blocks the reception of the service response packet when the policy is a policy to block the reception of the service response packet.

13. The logical network separation apparatus of claim 12, wherein the processing unit generates the first hash key with a predefined hash algorithm, and
the predefined hash algorithm generates a hash key, having the same value as the first hash key, of the service response packet corresponding to the service request packet.

14. The logical network separation apparatus of claim 12, wherein the address information comprises source Internet protocol (IP) address information, destination IP address information, source port address information, and destination port address information regarding the service request packet.

15. The logical network separation apparatus of claim 12, wherein the processing unit generates a second hash key on the basis of the address information included in the service response packet, determines whether the second hash key is in the hash table, updates the hash information corresponding to the second hash key when the second hash key is in the hash table, and determines whether to receive the service response packet on the basis of the policy corresponding to the second hash key.

* * * * *